(12) United States Patent
Kimura et al.

(10) Patent No.: US 8,092,945 B2
(45) Date of Patent: Jan. 10, 2012

(54) FUEL CELL SYSTEM

(75) Inventors: Kazutaka Kimura, Suntou-gun (JP); Kenji Tsubosaka, Susono (JP); Manabu Kato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1422 days.

(21) Appl. No.: 11/629,456

(22) PCT Filed: Nov. 3, 2005

(86) PCT No.: PCT/IB2005/003383
§ 371 (c)(1),
(2), (4) Date: Dec. 14, 2006

(87) PCT Pub. No.: WO2006/048764
PCT Pub. Date: May 11, 2006

(65) Prior Publication Data
US 2007/0237997 A1    Oct. 11, 2007

(30) Foreign Application Priority Data
Nov. 5, 2004  (JP) .................................. 2004-322891

(51) Int. Cl.
*H01M 8/06* (2006.01)
(52) U.S. Cl. ....................................... 429/409; 429/408

(58) Field of Classification Search ................. 429/12, 429/34, 38, 39, 408, 409
See application file for complete search history.

(56) References Cited

U.S. PATENT DOCUMENTS

| | | | |
|---|---|---|---|
| 6,939,630 B2 * | 9/2005 | Sotomura et al. | 429/13 |
| 7,220,509 B2 * | 5/2007 | Merzougui et al. | 429/492 |
| 7,537,857 B2 * | 5/2009 | Andrews et al. | 429/40 |
| 2003/0091889 A1 * | 5/2003 | Sotomura et al. | 429/40 |
| 2004/0043283 A1 | 3/2004 | Cipollini et al. | |
| 2006/0222920 A1 * | 10/2006 | Merzougui et al. | 429/30 |

FOREIGN PATENT DOCUMENTS

| | | |
|---|---|---|
| JP | A 2003-86192 | 3/2003 |
| JP | A 2003-100308 | 4/2003 |
| WO | WO 2004/023576 A2 | 3/2004 |

* cited by examiner

*Primary Examiner* — Patrick Ryan
*Assistant Examiner* — Julian Anthony
(74) *Attorney, Agent, or Firm* — Oliff & Berridge, PLC

(57) ABSTRACT

A fuel cell system includes a stack body that is formed by stacking a membrane-electrode assembly and a separator. The membrane-electrode assembly includes electrolyte layer and electrode layers one of which is provided on one side of the electrolyte layer and the other of which is provided on the other side of the electrolyte layer. Ions having the ability to decompose hydrogen peroxide are supplied to the membrane-electrode assembly.

25 Claims, 10 Drawing Sheets

INFLOW LINE

INFLOW LINE

INFLOW LINE

FUEL CELL SYSTEM

BACKGROUND OF THE INVENTION

1. Field of the Invention

The invention relates to a fuel cell system, and more particularly to a fuel cell system including a fuel cell having improved durability.

2. Description of the Related Art

In fuel cells, electric energy is generated by the electrochemical reaction that occurs in a membrane-electrode assembly (hereinafter, referred to as "MEA"). The MEA includes an electrolyte and electrodes (a cathode and an anode). One of the electrodes is provided on one side of the electrolyte, and the other of the electrodes is provided on the other side of the electrolyte. The electric energy generated is taken out of the MEA via separators. A separator is provided on one side of the MEA, and another separator is provided on the other side of the MEA. A polymer electrolyte fuel cell (hereinafter, referred to as "PEFC"), which is one type of fuel cell, is used in a co-generation system for home use, an automobile, and the like. The PEFC can operate at low temperatures. Generally, the PEFC operates between temperatures of 50 to 100° C. The PEFC has a high energy-conversion efficiency of 50 to 60%. It takes only a short time to start the operation of the PEFC. Also, PEFC systems are compact and light. Therefore, the PEFC is suitable for use as a power source for an electric vehicle, a portable power source, and the like.

An individual PEFC cell includes an electrolyte membrane, a cathode, an anode, and separators. Each of the cathode and the anode includes a catalyst layer and a diffusion layer. A single PEFC cell has a theoretical electromotive force of 1.23 volts. Because an individual cell has such a low electromotive force, it cannot supply sufficient power to move an electric vehicle and the like. Therefore, ordinarily, a fuel cell stack is used. A fuel cell stack includes a stack body, end plates, and the like. The stack body is formed by stacking individual cells in series. The end plates are disposed at both ends of the stack body in the direction in which the individual cells are stacked.

It has been found that when the fuel cell generates electric power, hydrogen peroxide is generated in the catalyst layer in the unit cell, which causes the polymer electrolyte of the MEA to deteriorate. The deterioration of the polymer electrolyte may reduce the electric power generation performance of the fuel cell. Therefore, it is desirable to suppress the deterioration of the polymer electrolyte by reducing the amount of hydrogen peroxide in the MEA, thereby improving the durability and the electric poser generation performance of the fuel cell.

Japanese Patent Application Publication No. JP 2003-100308 A (hereinafter "JP 2003-100308 A") discloses an example of a technology for improving the electric power generation performance of a fuel cell. More specifically, JP 2003-100308 A discloses a cathode catalyst for a fuel cell. In the cathode catalyst, a carrier that supports Pt further supports $CeO_2$. By using this catalyst, the reduction reaction of oxygen proceeds at an increased rate. Also, Japanese Patent Application Publication No. JP 2003-86192 A (hereinafter "JP 2003-86192 A") discloses a fuel cell in which a cathode electrode includes a catalyst/oxide/polymer electrolyte thin layer. The catalyst/oxide/polymer electrolyte thin layer is made of an oxide, a catalyst, and a solid polymer electrolyte material. In this fuel cell, cross over is suppressed. Thus, the reduction of the electric power generation performance due to the cross over can be prevented.

Various substances, such as reaction gas supplied from the outside of the fuel cell and water generated inside the fuel cell, move in the MEA. Therefore, even when a catalyst containing $CeO_2$ is mixed into the catalyst layer in advance according to the technology disclosed in JP 2003-100308 A, the catalyst containing $CeO_2$ is likely to be discharged from the MEA by the various materials. Thus, even when employing the technology disclosed in JP 2003-100308 A, it is difficult to maintain the effect of $CeO_2$ in the MEA, and to improve the durability of the fuel cell. Also, even when employing the technology disclosed in JP 2003-86192 A, it is difficult to improve the durability of the fuel cell.

SUMMARY OF THE INVENTION

It is an object of the invention to provide a fuel cell system including a fuel cell having improved durability.

In order to achieve the object, a first aspect of the invention relates to a fuel cell system including a stack body and supply means/portion. The stack body is formed by stacking a membrane-electrode assembly (hereinafter, referred to as "MEA") and a separator. The MEA includes an electrolyte layer and electrode layers, one of which is provided on one side of the electrolyte layer and the other of which is provided on the other side of the electrolyte layer. The supply means/portion supplies ions that can scavenge hydrogen peroxide in the MEA.

According to the first aspect of the invention, hydrogen peroxide scavinging ions can be supplied into the MEA from the outside of the MEA. Therefore, the MEA is constantly supplied with the ions while the fuel cell generates electric power. That is, according to the first aspect of the invention, the deterioration of the electrolyte caused by hydrogen peroxide can be suppressed by scaveneging the hydrogen peroxide in the MEA using ions that can scavenge hydrogen peroxide.

In the first aspect of the invention, a substance to be supplied to the membrane-electrode assembly may carry the ions to the MEA. The supply means/portion may include an inflow line for supplying the substance to be supplied to the membrane-electrode assembly; and ion adding means/portion for adding the ions to the substance to be supplied to the membrane-electrode assembly. The ion adding means/portion may be provided in either the inflow line or the separator.

With this configuration, the ion adding means/portion that is provided in either the inflow line or the separator can add the hydrogen peroxide scavenging ions to the substance to be supplied to the MEA before the substance reaches the MEA. Thus, the hydrogen peroxide scavenging ions can be easily supplied to the MEA.

The ion adding means/portion may include at least one of an element and a compound from which the hydrogen peroxide scaveneging ions are eluted; and ion elution promotion means/portion for promoting elution of the ions from the at least one of the element and the compound.

Because the ion adding means/portion includes the ion elution promotion means/portion for promoting the elution of the ions which have the ability to scavenge hydrogen peroxide from at least one of the element and the compound, the ions can be added to the substance to be supplied to the MEA more effectively. Thus, the hydrogen peroxide scavenging ions can be supplied to the MEA more easily.

The ion elution promotion means/portion may be an elution solvent adding means/portion for adding elution solvent that elutes hydrogen peroxide scavenging ions.

Because the hydrogen peroxide scavenging ions are eluted using the eluting solvent, the ions can be eluted at desired timing in the fuel cell system.

At least one of the element and the compound from which the ions having the ability to scavenge hydrogen peroxide are eluted may be replaceable.

In this configuration, either or both the element or the compound from which the ions having the ability to scavenge hydrogen peroxide are eluted is provided, and either or both of the element and the compound is replaceable. Therefore, a small amount of the at least one of the element and the compound can be added at a time. This prevents the reduction of the electric power generation performance caused by adding a great amount of the at least one of the element and the compound. Thus, the durability of the fuel cell can be improved in the fuel cell system without reducing the electric power generation performance for a long period.

The at least one of the element and the compound from which the hydrogen peroxide scavenging ions may be provided in a portion of the pipe extending in a horizontal direction, which includes at least a lower portion of the pipe in a direction of gravitational force. The amount of the at least one of the element and the compound per unit area of the portion of the pipe may be greater than the amount of the at least one of the element and the compound per unit area of any other portion of the pipe.

The substance that promotes elution of the ions which can scavenge hydrogen peroxide is likely accumulate in the low portion in the direction of gravitational force. With the aforementioned configuration, a greater amount of the at least one of the element and the compound from which the ions having the ability to scavenge hydrogen peroxide are eluted is provided in the low portion in the direction of gravitational force. Therefore, the ions having the ability to scavenge hydrogen peroxide can be effectively eluted. Thus, the durability of the fuel cell can be easily improved in the fuel cell system.

For example, the at least one of the element and the compound may be provided in a portion of the ion adding means/portion, which includes a lowermost portion of the ion adding means/portion in the direction of gravitational force. Also, the at least one of the element and the compound may be provided in the ion adding means/portion such that the average mass of the at least one of the element and the compound per unit area of a lower half portion of the ion adding means/portion in the direction of gravitational force is greater than the average mass of the at least one of the element and the compound per unit area of an upper half portion of the ion adding means/portion in the direction of gravitational force.

A hygroscopic material may be provided in at least a portion of the surface of the at least one of the element and the compound from which the hydrogen peroxide scavenging ions are eluted.

Because the hydroscopic material is provided in at least a portion of the surface of the at least one of the element and the compound, the substance that promotes the elution of the ion can be efficiently supplied to the surface of the at least one of the element and the compound. Thus, the ions can be easily eluted.

The ion adding means/portion may include the compound from which the hydrogen peroxide scavenging ions are eluted; and the eluting solvent adding means/portion. The compound may be a metal oxide, and the eluting solvent added by the eluting solvent adding means/portion may be an acidic solvent.

Because the hydrogen peroxide scavenging ions are eluted from the metal oxide using the acidic eluting solvent, the ions can be easily eluted, and the durability of the fuel cell can be improved in the fuel cell system.

The ion adding means/portion may include ion-containing liquid storage means/portion for storing liquid containing the hydrogen peroxide scavenging ions; and introduction means/portion for introducing the liquid in the ion-containing liquid storage means/portion to the at least one of the inflow line and the separator. Also, the introduction means/portion may include control means/portion for controlling a mode in which the liquid containing the hydrogen peroxide scavenging ions is introduced into the either or both of the inflow line and the separator.

Because the liquid containing the hydrogen peroxide scavenging ions is supplied to the MEA, the hydrogen peroxide in the MEA can be decomposed by the ions more effectively. Also, because the control means/portion is provided for controlling the mode in which the liquid containing the hydrogen peroxide scavenging ions is introduced, the amount of the liquid to be supplied to the MEA, timing at which the liquid can be supplied to the MEA, and the like can be controlled. Thus, the liquid containing the ions can be used without wasting the liquid in the fuel cell system.

It is known that hydrogen peroxide is generated in a catalyst layer when the fuel cell generates electric power. The electrolyte layer constituting the MEA deteriorates due to OH radicals generated from hydrogen peroxide. By supplying the hydrogen peroxide scavenging ions into the MEA from the outside of the MEA, the hydrogen peroxide generated in the MEA can be scavenged for a long time. Because the deterioration of the electrolyte layer is easily suppressed for a long time, the durability of the fuel cell can be improved in the fuel cell system.

The invention has been made in view of the above. A key feature of the invention is to provide a fuel cell system in which the durability of the fuel cell can be improved by supplying hydrogen peroxide scavenging ions to the MEA.

BRIEF DESCRIPTION OF THE DRAWINGS

The foregoing and further objects, features and advantages of the invention will become apparent from the following description of exemplary embodiments with reference to the accompanying drawings, and wherein.

DETAILED DESCRIPTION OF THE EXEMPLARY EMBODIMENTS

Hereinafter, a fuel cell system according to exemplary embodiments of the invention will be described with reference to the drawings. In the exemplary embodiments, a PEFC is used.

Figure 1:
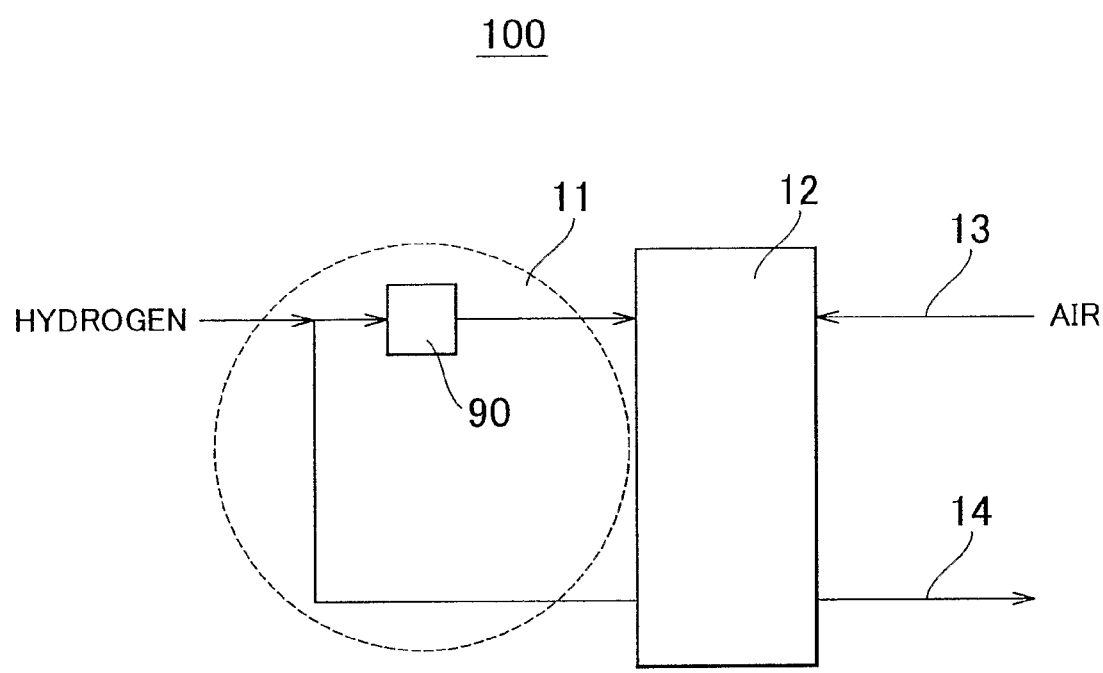
FIG. 1 is a schematic diagram showing a fuel cell system in a first embodiment of the invention.

FIG. 1 is a schematic diagram showing a fuel cell system in a first embodiment of the invention. As shown in FIG. 1, a fuel cell system 100 according to the first embodiment of the invention includes an anode inflow line 11, a fuel cell stack (hereinafter, referred to as "FC stack") 12, a cathode inflow line 13, and a cathode discharge line 14. The anode inflow line 11 is a circulating system for circulating and supplying a substance containing hydrogen, which can include, but is not limited to diatomic hydrogen. The FC stack 12 includes a stack body (not shown) formed by stacking MEAs and separators. The cathode inflow line 13 is a non-circulating system for supplying a substance containing oxygen, which can include, but is not limited to atmospheric air. Ion adding means/portion 90 is provided in the anode inflow line 11. The ion adding means/portion 90 according to this embodiment is a pipe that constitutes a portion of the anode inflow line 11. More specifically, the ion adding means/portion 90 (hereinafter, may be referred to as "pipe 90") constitutes an upstream portion of the anode inflow line 11. The entire inner surface of the pipe 90 is coated with Ce. More specifically, the Ce coating in the lower portion in the direction of gravitational force is thicker than the Ce coating in any other portion. When the fuel cell generates electric power, acid (for example, sulfuric acid) is eluted from the electrolyte membrane in the FC stack. When the acid contacts the Ce coating provided on the inner surface of the pipe 90, $Ce^{3+}$ ions, which are able to scavenge hydrogen peroxide by decomposing hydrogen peroxide, are eluted from the inner surface of the pipe 90. Then, the $Ce^{3+}$ ions are supplied to the MEA of the FC stack via the circulating anode inflow line 11. Thus, hydrogen peroxide in the MEA is scavenged, and the deterioration of the electrolyte membrane is suppressed. In FIG. 1 and in FIGS. 3 through 10 each showing the fuel cell according to the invention, each arrow schematically indicates the direction of the flow of the substance to be supplied to the MEA, or the direction of the flow of the substance discharged from the MEA.

Figure 2:
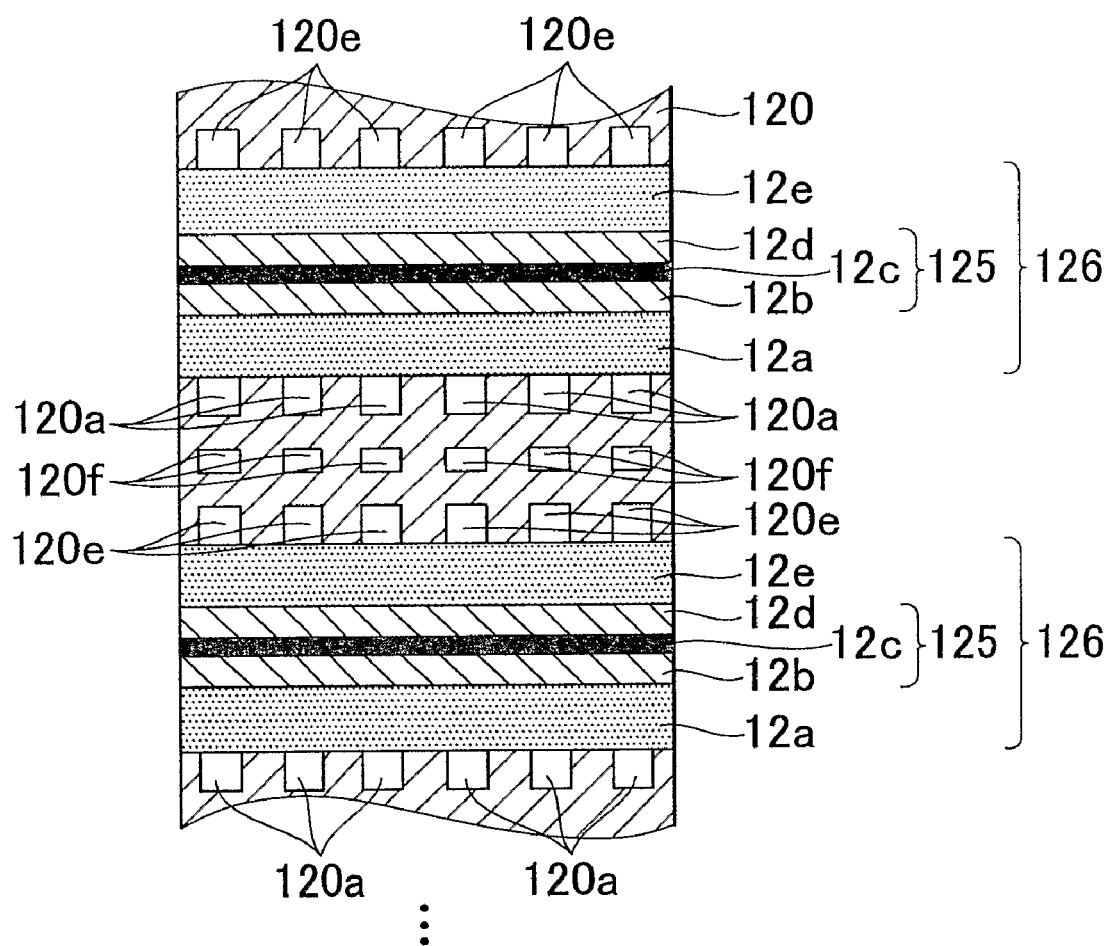
FIG. 2 is a schematic sectional view showing an example of the configuration of the fuel cell stack.

FIG. 2 schematically shows an example of the configuration of FC stack 12 of the fuel cell system according to the invention. More specifically, FIG. 2 is a schematic sectional view showing an enlarged portion of the FC stack 12. In the FC stack 12, a power collection plate (not shown) and the like are provided on two sides of the stack body. The stack body includes a membrane-electrode-gas diffusion layer assembly (hereinafter, referred to as "MEGAs") 126, and separators 120. The MEGA 126 includes membrane-electrode assembly (MEA) 125, cathode diffusion layer 12a that is provided on one side of MEA 125, and anode diffusion layer 12e that is provided on the other side of MEA 125. The MEA 125 includes electrolyte membrane 12c, cathode electrode layer 12b that is provided on one side of electrolyte membrane 12c, and an anode electrode layer 12d that is provided on the other side of the electrolyte membrane 12c. As shown in FIG. 2, the MEGA 126 is held between the separators 120. Reaction gas supply passages 120a are formed on the surface of each separator 120 that contacts the diffusion layer 12a. Reaction passages 120e are formed on the surface of each separator 120 that contacts the diffusion layer 12e. Further, cooling medium supply passages 120f are formed in each separator 120. The cooling medium for cooling the MEGAs 126 is supplied through the cooling medium supply passages 120f. In the aforementioned FC stack 12, hydrogen supplied from the anode inflow line 11 is supplied to the anode electrode layer 12d via the reaction gas supply passages 120e and the anode diffusion layer 12e. Air supplied from the cathode inflow line 13 is supplied to the cathode electrode layer 12b via the reaction gas supply passages 120a and the cathode diffusion layer 12a.

In the fuel cell system 100 according to the first embodiment, $Ce^{3+}$ ions are supplied from the anode. The electrolyte membrane used in the PEFC is permeable to positive ions. Therefore, after $Ce^{3+}$ ions supplied from the anode reach the electrolyte membrane 12c and scavenge hydrogen peroxide, remaining $Ce^{3+}$ ions pass through the electrolyte membrane 12c to reach the cathode. Thus, in the fuel cell system according to this embodiment, because the $Ce^{3+}$ ions are supplied via the anode inflow line 11, the $Ce^{3+}$ ions can be diffused over the entire MEA 125. Therefore, the deterioration of the electrolyte membrane 12c can be effectively suppressed.

As described above, acid is produced as a by-product in the electrolyte membrane when the fuel cell generates electric power. The acid is used to determine whether the electrolyte membrane has deteriorated. More specifically, it can be determined whether the electrolyte membrane has deteriorated based on whether acid has been discharged from the FC stack. As described above, in the fuel cell system 100 according to this embodiment, the acid that is discharged from the FC stack 12 serves as the ion elution promotion means/portion, and $Ce^{3+}$ ions are eluted from the pipe 90 using only the discharged acid. The deterioration of the electrolyte membrane 12c is suppressed by the $Ce^{3+}$ ions. More specifically, in the fuel cell system 100 according to this embodiment, the deterioration of the electrolyte membrane 12c is suppressed using the ions that are eluted by the acid generated due to the deterioration of the electrolyte membrane 12c. That is, the fuel cell system 100 according to this embodiment is self-repairing. Thus, in the fuel cell system 100, the electrolyte membrane 12c of the PEFC that has deteriorated during electric power generation can be appropriately repaired according to the degree of the deterioration.

Figure 3A:
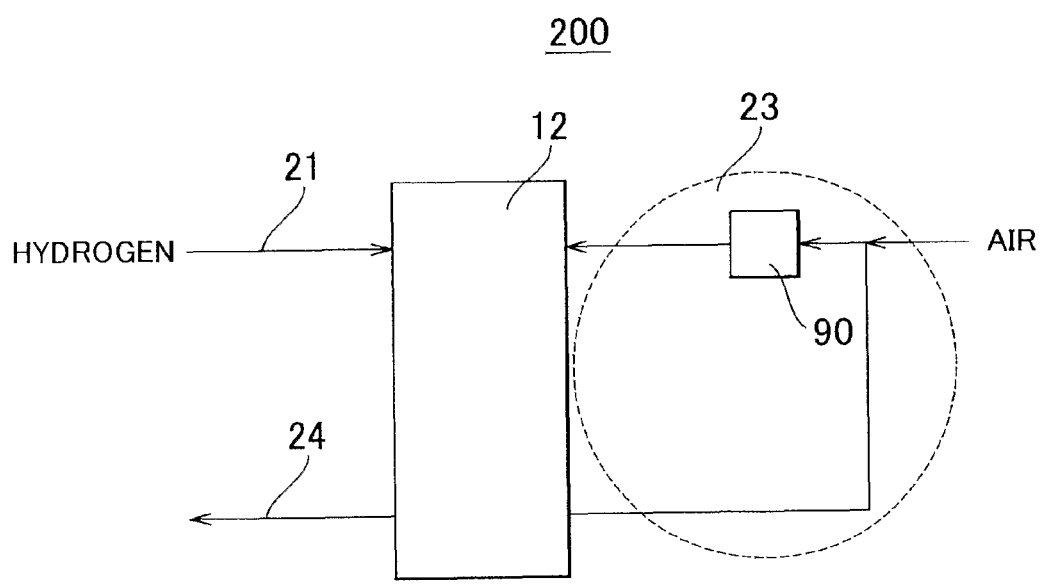
FIGS. 3A and 3B are schematic diagrams each showing a fuel cell system in an exemplary embodiment of the invention.

FIG. 3A is a schematic diagram showing a fuel cell system according to a second embodiment of the invention. As shown in FIG. 3A, a fuel cell system 200 according to the second embodiment of the invention includes an anode inflow line 21, an anode discharge line 24, the FC stack 12, and a cathode inflow line 23. The anode inflow line 21 is a non-circulating system for supplying hydrogen. The cathode inflow line 23 is a circulating system for circulating and supplying air. The pipe 90 is provided upstream of the cathode inflow line 23. In FIG. 3A, portions corresponding to those described in fuel cell system 100 according to the first embodiment are denoted using the same reference numerals as in FIG. 1, and detailed description thereof will be omitted.

In the fuel cell system 200 according to the second embodiment shown in FIG. 3A, $Ce^{3+}$ ions are supplied from the cathode. More specifically, according to the second embodiment, $Ce^{3+}$ ions are supplied to the MEA 125 via the cathode inflow line 23, and hydrogen peroxide in the MEA 125 can be scavenged. Therefore, in the fuel cell system 200 according to the second embodiment, the deterioration of the electrolyte membrane 12c can be suppressed as well. Thus, the durability of the fuel cell can be improved in the fuel cell system 200 according to the second embodiment.

Figure 3B:
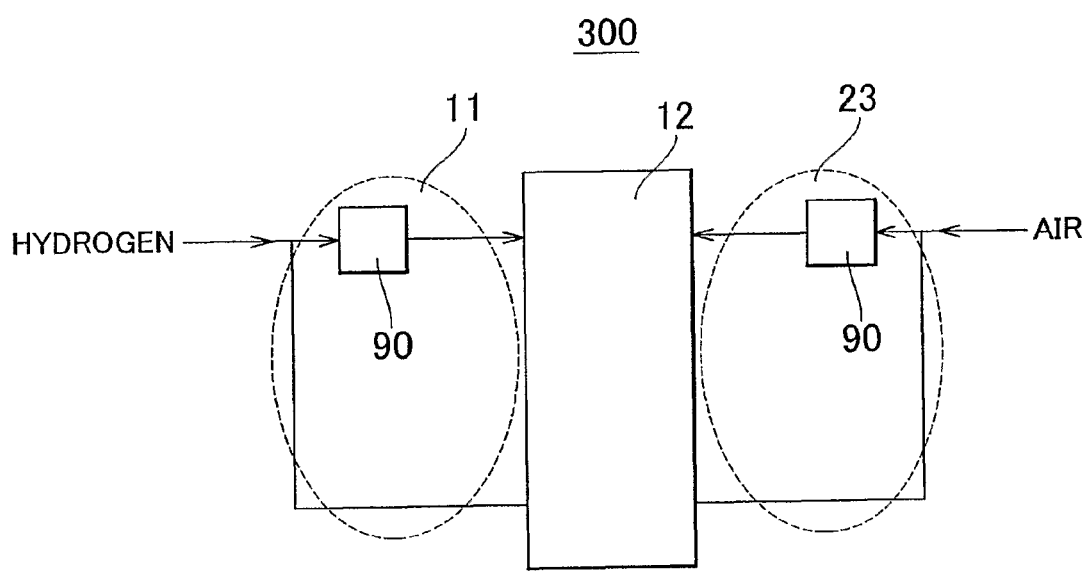

FIG. 3B is a schematic diagram showing a fuel cell system according to a third embodiment of the invention. As shown in FIG. 3B, a fuel cell system 300 according to this third embodiment includes anode inflow line 11, FC stack 12, and cathode inflow line 23. The anode inflow line 11 is the circulating system for circulating and supplying hydrogen. The cathode inflow line 23 is the circulating system for circulating and supplying air. The pipe 90 is provided upstream of the anode inflow line 11. Also, a second pipe 90 is provided upstream of the cathode inflow line 23. In FIG. 3B, portions corresponding to those of fuel cell system 100, described in the first embodiment, or those of the fuel cell system 200, described in the second embodiment, are denoted by the same reference numerals as in FIG. 1 or FIG. 3A, and detailed description thereof will be omitted.

Fuel cell system 300, according to a third embodiment, is shown in FIG. 3B, $Ce^{3+}$ ions are supplied from the anode and the cathode. Thus, in the third embodiment, $Ce^{3+}$ ions can be supplied from both sides of the MEA 125 (i.e., from the anode and the cathode). Therefore, the deterioration of the electrolyte membrane 12c can be suppressed more effectively. Thus, the durability of the fuel cell can be improved more effectively in the fuel cell system 300 in the third embodiment.

In the above described exemplary embodiment, the pipe 90 has an inner surface coated with Ce and is provided upstream of each circulating inflow line (i.e., on the supply side of the fuel stack). However, the placement of pipe 90 is not limited to positions upstream of each circulating inflow line. The ion adding means/portion 90 may be provided in an appropriate position, for example, downstream of the inflow line (i.e., on the discharge side of the fuel stack).

Figure 4A:
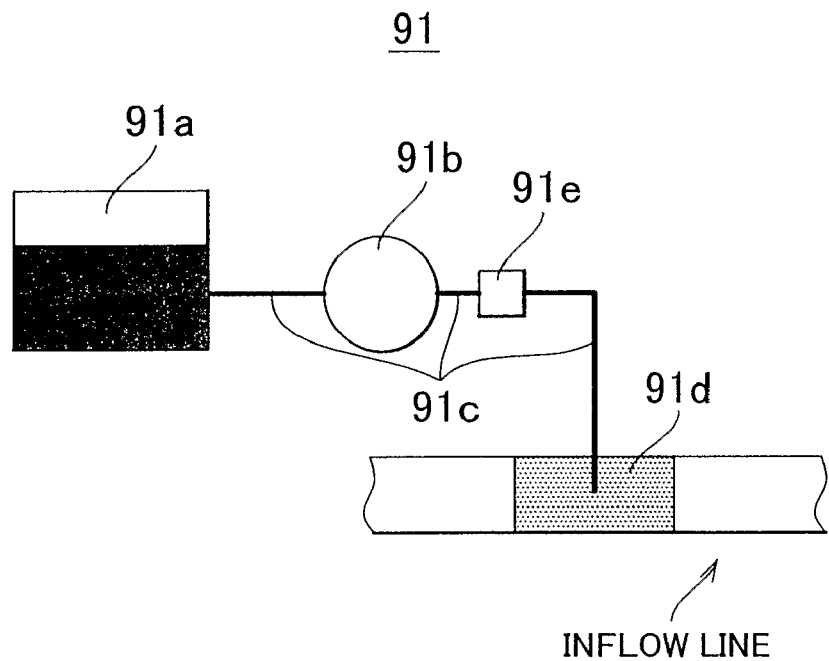
FIGS. 4A and 4B are schematic diagrams each showing an example of ion adding means/portion.
Figure 4B:
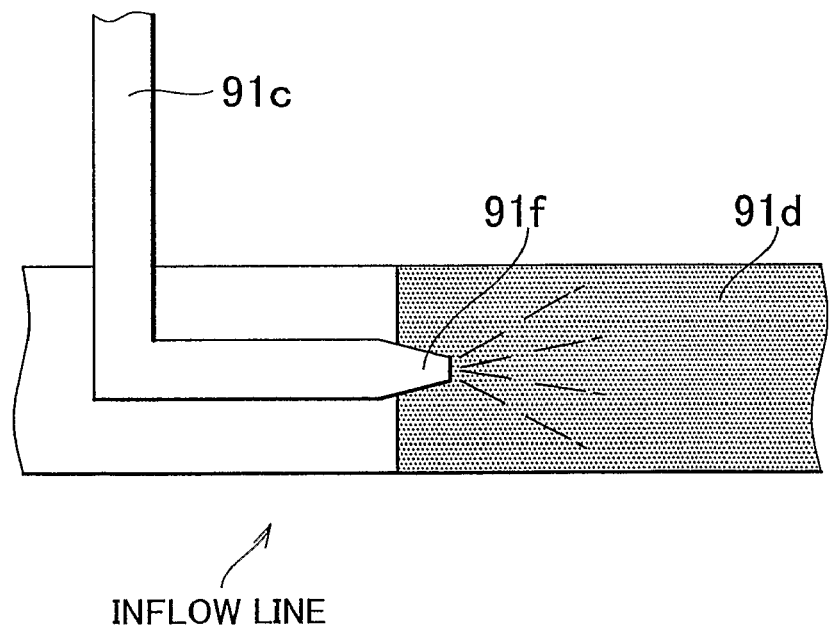

Also, in the aforementioned description, $Ce^{3+}$ ions are eluted from the inner surface of the pipe 90 using acid that is discharged from the electrolyte membrane 12c. However, the pipe 90 is not limited to this configuration. For example, $Ce^{3+}$ ions may be eluted using an eluting solvent supplied from a source external to the ion addition means/portion 90, in addition to the aforementioned acid. Each of FIGS. 4A and 4B schematically shows an ion adding means/portion having this configuration. The ion adding means/portion described below can be applied to a fuel cell system in which $Ce^{3+}$ ions are eluted using eluting solvent that is supplied from a source external to the ion adding means/portion 90, instead of the aforementioned acid discharged from the electrolyte membrane 12c.

As shown in FIG. 4A, ion adding means/portion 91 includes storage means/portion 91a, a delivery pump 91b, a pipe 91d, delivery control means/portion 91e, and a connection pipe 91c. The eluting solvent is stored in the storage means/portion 91a. The Ce coating is provided on the entire inner surface of the pipe 91d. The delivery pump 91b delivers the eluting solvent to the pipe 91d. The delivery control means/portion 91e controls the amount of the eluting solvent to be delivered and the timing at which the eluting solvent is delivered. The connection pipe 91c connects these components. The pipe 91d constitutes a portion of the anode inflow line and/or a portion of the cathode inflow line. The storage means/portion 91a, the delivery pump 91b, the connection pipe 91c, and the delivery control means/portion 91e function as the ion elution promotion means/portion (eluting solvent supply means/portion). FIG. 4B schematically shows an enlarged portion of the connection pipe 91c and an enlarged portion of the pipe 91d. As shown in FIG. 4B, the eluting solvent is delivered through the connection pipe 91c. Then, the eluting solvent is uniformly injected into the pipe 91d whose inner surface is coated with Ce. For example, the eluting solvent is injected via a nozzle 91f with a tapered shape that is provided at the end of the pipe 91c. The inner surface of the pipe 91d is coated with Ce such that the Ce coating layer in the low portion in the direction of gravitational force is thicker than the Ce coating layer in any other portions. By providing an ion adding means/portion 91 with this configuration, $Ce^{3+}$ ions can be eluted from the coating layer in the pipe 91d using the eluting solvent. In addition, even in the case where the eluting solvent flows downward in the direction of gravitational force, $Ce^{3+}$ ions can be eluted effectively because the Ce coating layer in the low portion in the direction of gravitational force is thick. Thus, in the fuel cell system including the supply means/portion 91, the durability of the fuel cell can be improved.

Figure 5A:
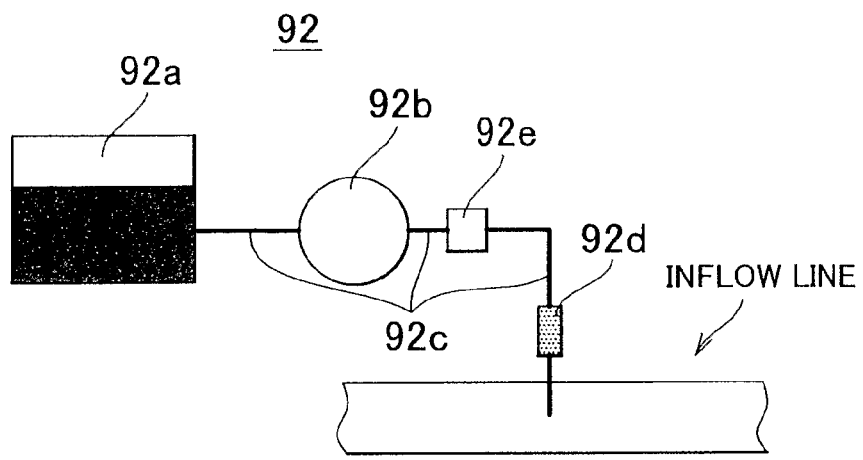
FIGS. 5A, 5B, and 5C are schematic diagrams each showing an example of ion adding means/portion.
Figure 5B:
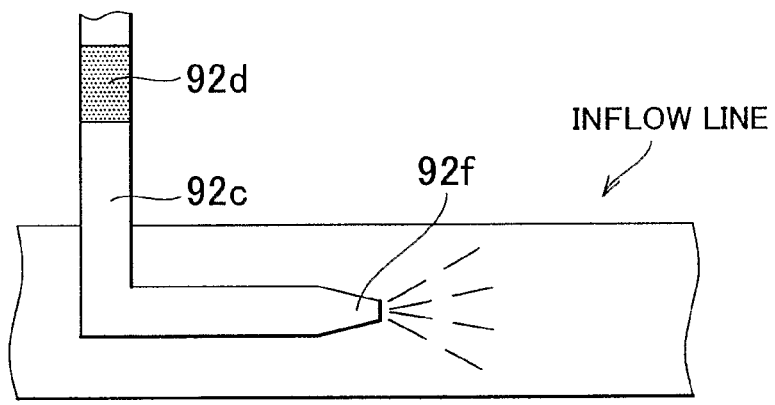
Figure 5C:
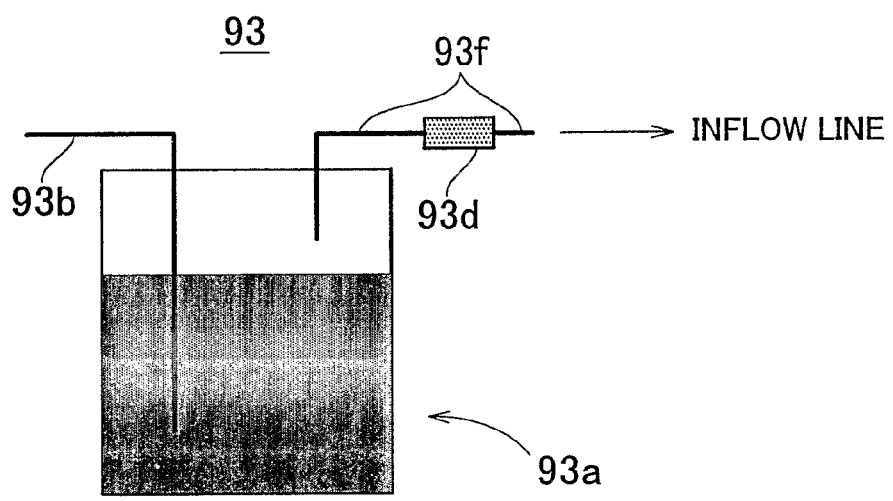

In the aforementioned description, the ion adding means/portion includes the pipe with the inner surface coated with Ce, which constitutes a portion of the inflow line. However, the ion adding means/portion of the fuel cell system according to this embodiment is not limited to this configuration. For example, the Ce coating may be provided on the entire inner surface of the pipe constituting the inflow line. FIGS. 5A, 5B, and 5C show ion adding means/portion having other configurations according to the invention.

Ion adding means/portion 92 shown in FIG. 5A includes storage means/portion 92a, a coating member 92d, a delivery pump 92b, delivery control means/portion 92e, and a connection pipe 92c. The eluting solvent is stored in the storage means/portion 92a. The coating member 92d is replaceable. The inner surface of the coating member 92d is coated with Ce. The delivery pump 92b delivers the eluting solvent to the coating member 92d and the inflow line. The delivery control means/portion 92e controls the amount of the eluting solvent to be delivered and the timing at which the eluting solvent is delivered. The connection pipe 92c connects these components. The storage means/portion 92a, the delivery pump 92b, the connection pipe 92c, and the delivery control means/portion 92e function as the ion elution promotion means/portion (eluting solvent supply means/portion). FIG. 5B schematically shows an enlarged portion of the connection pipe 92c provided between the coating member 92d and the inflow line, and an enlarged portion of the inflow line. As shown in FIG. 5B, the eluting solvent containing $Ce^{3+}$ ions is delivered through the connection pipe 92c. Then, the eluting solvent is uniformly injected into the inflow line. For example, the eluting solvent is injected via a nozzle 92f with a tapered shape that is provided at the end of the pipe 92c. In the case where the ion adding means/portion 92 has this configuration, the replaceable coating member 92d is provided outside the inflow line, and the eluting solvent containing $Ce^{3+}$ ions is injected into the inflow line. Thus, $Ce^{3+}$ ions can be supplied into the MEA 125 via the inflow line. Accordingly, by providing the ion adding means/portion 92, the durability of the fuel cell can be improved in the fuel cell system, and the maintenance operation for the fuel cell system can be performed easily.

Ion adding means/portion 93 shown in FIG. 5C includes storage means/portion 93a, a coating member 93d, a supply pipe 93b, and a supply pipe 93f. The eluting solvent is stored in the storage means/portion 93a. The coating member 93d is replaceable. The inner surface of the coating member 93d is coated with Ce. A gas (for example, air) is supplied into the eluting solvent stored in the storage means/portion 93a through the supply pipe 93b. Vapor, drops and the like of the eluting solvent are supplied to the coating member 93d through the supply pipe 93f. Also, the vapor and the like that have passed through the coating member 93d are supplied to the inflow line through the supply pipe 93f. By providing the ion adding means/portion 93 having this bubbler configuration, bubbles are generated in the eluting solvent by the gas supplied from the supply pipe 93b, and $Ce^{3+}$ ions can be eluted from the coating member 93d by drops and the like scattered from the liquid surface of the eluting solvent. Thus, by providing the ion adding means/portion 93 having this configuration, the durability of the fuel cell can be improved in the fuel cell system. In the ion adding means/portion 93 according to this embodiment, the storage means/portion 93a, the supply pipe 93b, and the supply pipe 93f function as the ion elution promotion means/portion (the eluting solvent supply means/portion).

Figure 6:
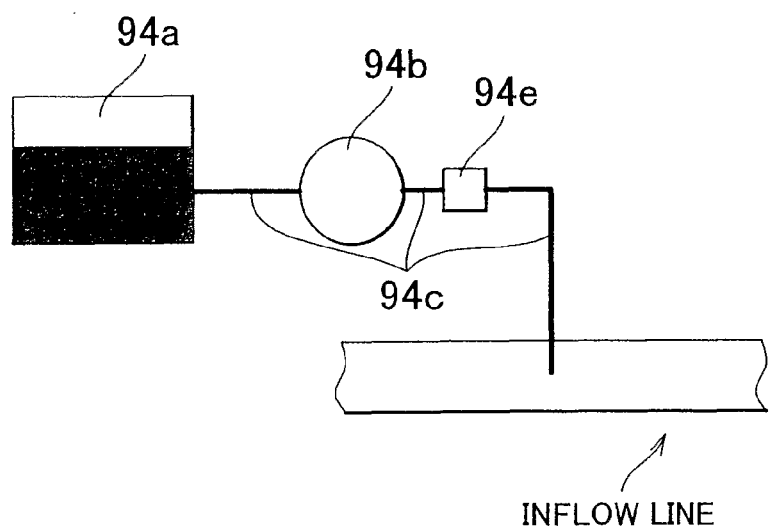
FIG. 6 is a schematic diagram showing an example of ion adding means/portion.

In the aforementioned description, the ion adding means/portion includes the pipe coated with Ce, or the coating member coated with Ce. However, the ion adding means/portion of the fuel cell system according to the invention is not limited to this configuration. FIG. 6 schematically shows ion adding means/portion having another configuration, that can be provided in the fuel cell system according to the invention.

Ion adding means/portion 94 shown in FIG. 6 includes ion-containing liquid storage means/portion 94a, a delivery pump 94b, control means/portion 94e, and a connection pipe 94c. Liquid containing $Ce^{3+}$ ions is stored in the ion-containing liquid storage means/portion 94a. The delivery pump 94b introduces the liquid stored in the ion-containing liquid storage means/portion 94a into the inflow line. The control means/portion 94e controls the amount of the liquid to be introduced into the inflow line and the timing at which the liquid is introduced. The connection pipe 94c connects the ion-containing liquid storage means/portion 94a, the delivery pump 94b, the control means/portion 94e, and the inflow line. In the ion adding means/portion 94 according to this embodiment, the delivery pump 94b, the connection pipe 94c, and the control means/portion 94e function as the introduction means/portion. In the case where the fuel cell system according to the invention includes the ion adding means/portion 94 having this configuration, hydrogen peroxide in the MEA 125 can be scavenged by supplying the liquid containing $Ce^{3+}$ ions into the fuel cell stack via the inflow line, for example, when the operation of the fuel cell is stopped. Also, because the ion adding means/portion 94 includes the control means/portion 94e, the ion adding means/portion 94 can supply the liquid containing $Ce^{3+}$ ions into the MEA 125 without wasting the liquid. Further, the ion adding means/portion having another bubbler configuration according to the invention includes ion-containing liquid storage means/portion, a first supply pipe, and a second supply pipe. Liquid containing $Ce^{3+}$ ions is stored in the ion-containing liquid storage means/portion. Gas is supplied to the liquid in the ion-containing liquid storage means/portion through the first supply pipe. Drops and the like scattered from the ion-containing liquid are supplied to the inflow line through the second supply pipe. In the ion adding means/portion having this configuration, the first supply pipe and the second supply pipe function as the introduction means/portion. Thus, the ion adding means/portion having this configuration can supply the liquid containing $Ce^{3+}$ ions into the MEA 125.

In the above description of the ion adding means/portion including the pipe whose inner surface is coated with Ce, where the Ce coating layer in the low portion in the direction of gravitational force is thicker than the Ce coating layer in any other portion. However, the configuration of the Ce coating layer is not limited to this configuration. The Ce coating layer may be of a uniform thickness in the entire inner surface of the pipe. Also, in the case where the Ce coating layer in the low portion in the direction of gravitational force is thicker than the Ce coating layer in any other portion, the eluting solvent does not have to be injected uniformly into the pipe. In contrast, in the case where the Ce coating layer is of a uniform thickness in the entire inner surface of the pipe, it is preferable to inject the eluting solvent uniformly into the pipe. With this configuration, $Ce^{3+}$ ions can be eluted effectively. Further, in the above description of the ion supply means/portion including the delivery pump, the ion adding means/portion includes the control means/portion. However, the ion adding means/portion including the delivery pump according to the invention is not required to include the control means/portion. In the case where the ion adding means/portion according to the invention includes the control means/portion, a control method for controlling the delivery of the eluting solvent or the ion-containing liquid is not limited to a specific method. For example, the eluting solvent or the ion-containing liquid may be delivered when the operation of the fuel cell stops. The eluting solvent or the ion-containing liquid may be delivered when the voltage of the fuel cell system drops. Alternatively, the following control method may be employed. The relationship between the operation mode of the fuel cell and the deterioration behavior of the electrolyte membrane is studied in advance, and the timing for delivering the eluting solvent or the ion-containing liquid is determined based on the actual operation mode and the result of the study, and then the eluting solvent or the ion-containing liquid is delivered at the determined timing.

In addition, in the above description, the fuel cell system includes the circulating inflow line. However, the configuration of the fuel cell system is not limited to this configuration. The invention can be applied to the fuel cell system that does not include the circulating inflow line. Hereinafter, the case where the invention is applied to the fuel cell system that does not include the circulating inflow line will be described.

Figure 7:
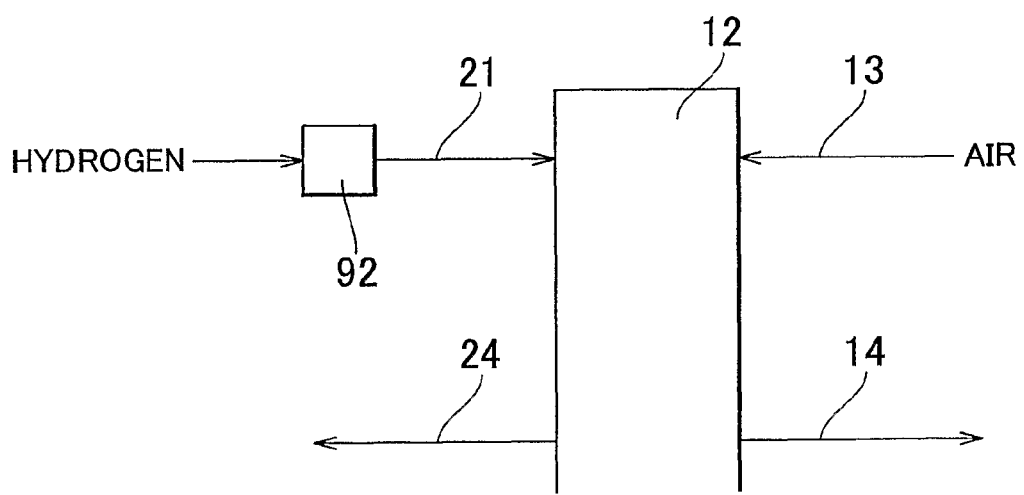
FIG. 7 is a schematic diagram showing a fuel cell system in a fourth embodiment of the invention.

FIG. 7 is a schematic diagram showing a fuel cell system in a fourth embodiment of the invention. As shown in FIG. 7, a fuel cell system 400 according to a fourth embodiment of the invention includes anode inflow line 21, anode discharge line 24, cathode inflow line 13, cathode discharge line 14, and FC stack 12. The anode inflow line 21 is the non-circulating system for supplying hydrogen. The cathode inflow line 13 is the non-circulating system for supplying air. The ion adding means/portion 92 is provided in the non-circulating anode inflow line 21. Because the fuel cell system 400 in this embodiment includes the aforementioned ion adding means/portion 92, $Ce^{3+}$ ions eluted using the eluting solvent can be supplied to the MEA 125. Therefore, the durability of the fuel cell can be improved in the fuel cell system.

As described above, in the case where the ion adding means/portion is provided in the circulating inflow line, the ion adding means/portion can be provided on the discharge side of the FC stack. However, if the ion adding means/portion is provided on the discharge side of the FC stack in a fuel cell system that does not include the circulating inflow line, it is difficult to supply $Ce^{3+}$ ions to the MEA in the FC stack. Therefore, in the fuel cell system that does not include the circulating inflow line, it is preferable to provide the ion adding means/portion in a position other than the discharge side of the FC stack.

Figure 8A:
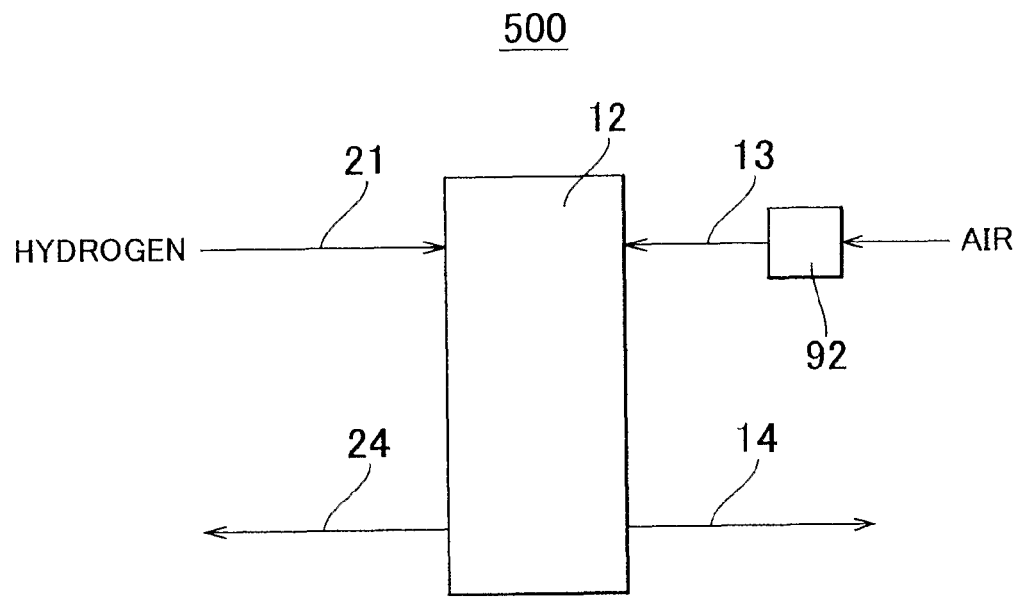
FIGS. 8A and 8B are schematic diagrams each showing a fuel cell system in an exemplary embodiment of the invention.

FIG. 8A is a schematic diagram showing a fuel cell system according to a fifth embodiment of the invention. As shown in FIG. 8A, a fuel cell system 500 in the fifth embodiment has the same configuration as that of the fuel cell system 400 in the fourth embodiment, except that the ion adding means/portion 92 is provided in the non-circulating inflow line 13, instead of the non-circulating anode inflow line 21. Those portions of the fuel cell system 500 in the fourth embodiment, as shown in FIG. 8A, corresponding to those of the fuel cell system 400 in the fourth embodiment are denoted by the same reference numerals as in FIG. 7, and detailed descriptions thereof will be omitted.

In the fuel cell system 500 in the fifth embodiment shown in FIG. 8A, $Ce^{3+}$ ions are supplied via the non-circulating cathode inflow line 13. In this embodiment, by supplying $Ce^{3+}$ ions to the MEA 125 via the non-circulating cathode inflow line 13, hydrogen peroxide in the MEA 125 can be scavenged. Thus, the durability of the fuel cell can be improved in the fuel cell system 500 in the fifth embodiment.

Figure 8B:
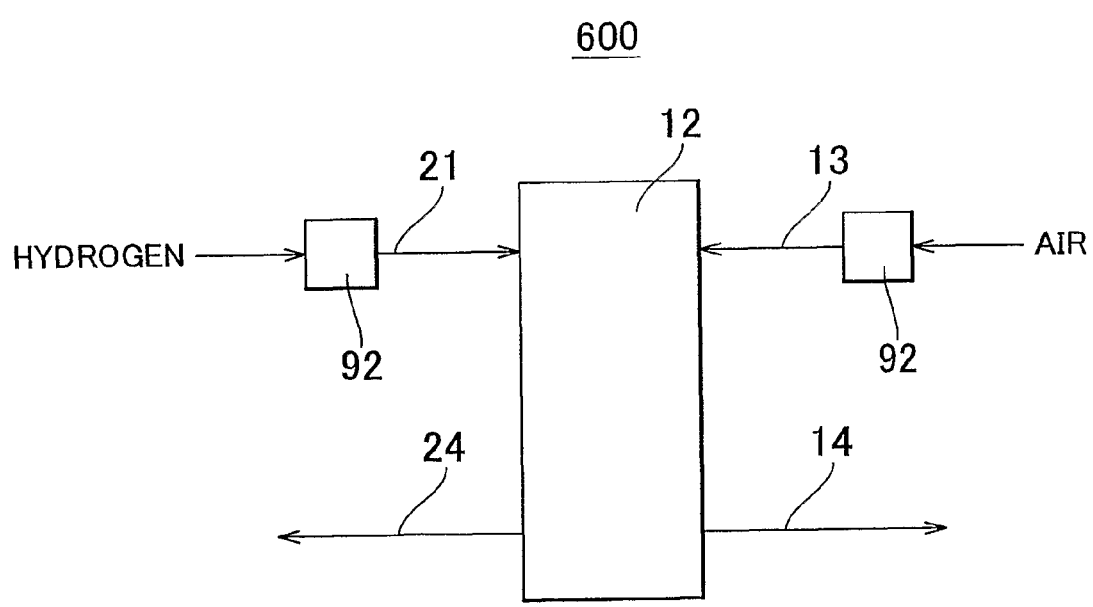

FIG. 8B is a schematic diagram showing a fuel cell system according to a sixth embodiment of the invention. As shown in FIG. 8B, a fuel cell system 600 in the sixth embodiment of the invention includes the anode inflow line 21, the anode discharge line 24, the cathode inflow line 13, the cathode discharge line 14, and the FC stack 12. The anode inflow line 21 is the non-circulating system for supplying hydrogen. The cathode inflow line 13 is the non-circulating system for supplying air. The ion adding means/portion 92 is provided in the non-circulating anode inflow line 21. Another ion adding means/portion 92 is provided in the non-circulating cathode inflow line 13. Those portions of fuel cell system 600 shown in FIG. 8B, corresponding to those of the fuel cell system 400 in the fourth embodiment or those of the fuel cell system 500 in the fifth embodiment are denoted by the same reference numerals as in FIG. 7 or FIG. 8, and detailed description thereof will be omitted.

In the fuel cell system 600 in the sixth embodiment shown in FIG. 8B, $Ce^{3+}$ ions are supplied from the anode and the cathode. Thus, in this embodiment, $Ce^{3+}$ ions can be supplied from the both sides of the MEA. Therefore, the deterioration of the electrolyte membrane can be suppressed more effectively. Thus, the durability of the fuel cell can be improved more effectively in the fuel cell system 600 in the sixth embodiment.

In the above description of the fuel cell system that does not include the circulating inflow line, the ion adding means/portion 92 is provided in the inflow line. However, the ion adding means/portion that can be provided in the fuel cell system that does not include the circulating inflow line is not limited to the ion adding means/portion 92. The ion adding means/portion 93, the ion adding means/portion 94, or the ion adding means/portion having other configurations may be provided in the fuel cell system that does not include the circulating inflow line.

In the fuel cell system according to the invention, the eluting solvent or the like that is supplied into the inflow line is likely to accumulate in the low portion of the pipe in the direction of gravitational force. Therefore, in the case where the Ce coating layer is provided on the inner surface of the pipe of the inflow line, it is preferable to coat the surface of the Ce coating layer with hygroscopic material, in order to spread vapor, acid, eluting solvent, and the like to portions other than the low portion in the direction of gravitational force as well. With this configuration, $Ce^{3+}$ ions can be easily eluted also from the portions other than the low portion in the direction of gravitational force. Therefore efficiency of eluting $Ce^{3+}$ ions can be improved.

In the case where the surface of the Ce coating layer is coated with hygroscopic material, it is preferable to provide a cylindrical mesh member or the like made of anticorrosion material in the pipe having the Ce coating layer, and to fix the Ce coating layer and the hygroscopic material between the inner wall of the pipe and the mesh member or the like, in order to prevent the hygroscopic material from flowing out, and to prevent contact failure between the hygroscopic material and the Ce coating layer.

The hygroscopic material provided in the inflow line pipe according to the invention is not limited to a specific material. Any hygroscopic material that can tolerate the environment inside the pipe may be used. Examples of suitable hydroscopic materials include cellulose and hydroscopic resin.

Also, the structure of the hydroscopic material is not limited to a specific structure. However, it is preferable to provide the hydroscopic material having a honeycomb structure or the like, in order to increase the contact area between the hydroscopic material and the Ce coating layer, to effectively use Ce, and to allow $Ce^{3+}$ ions to be supplied to the MEA 125. In the case where the hydroscopic material having the honeycomb structure is provided, it is preferable to provide Ce in the hole portions in the honeycomb structure. The material of the mesh member or the like that can be provided in the pipe of the inflow line is not limited to a specific material. Any material that can tolerate the environment inside the pipe may be used. Examples of the material include high-corrosion resistant metal such as titanium alloy.

In the above description, the ion adding means/portion is provided in the inflow line connected to the FC stack 12 in the fuel cell system. In the fuel cell system according to the invention, the position in which the ion adding means/portion is provided is not limited to the inflow line. For example, the ion adding means/portion may be provided in a humidification module, or in the separator in the FC stack. Hereinafter, description will be made of the fuel cell system in which the ion adding means/portion is provided in the separator.

Figure 9A:
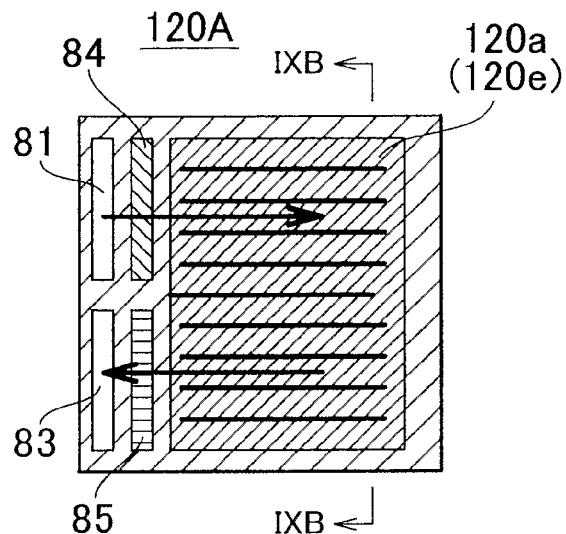
FIG. 9 is a schematic diagram showing an example of a separator including ion adding means/portion.
Figure 9B:
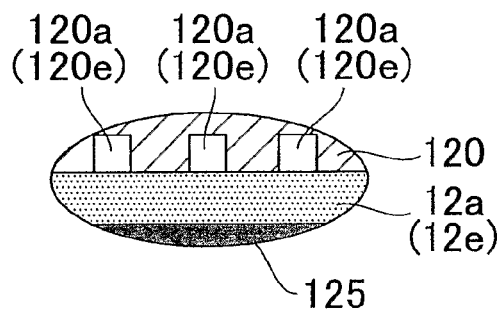

FIG. 9A is a schematic front view of the separator in the FC stack 12, which includes the ion adding means/portion. The ion adding means/portion is provided on the surface of a portion of the separator. FIG. 9B is a sectional view of the separator taken along line IXB-IXB in FIG. 9A. FIG. 9B schematically shows an enlarged portion of the gas diffusion layer (hereinafter, referred to as "GDL") that contacts the separator, and an enlarged portion of the MEA. A separator 120A shown in FIG. 9A includes an inlet manifold 81, reaction gas passages 120a (120e), and an outlet manifold 83. Reaction gas (hydrogen and air) supplied from the inflow line passes through the inlet manifold 81. After the reaction gas passes through the reaction gas passages 120a (120e), the reaction gas passes through the outlet manifold 83. The Ce coating is provided on the surface of a portion 84 between the inlet manifold 81 and the reaction gas passages 120a (120e). Each arrow in FIG. 9A schematically shows the direction of the flow of the reaction gas.

In the case where the reaction gas supplied from the circulating inflow line through the inlet manifold 81, a small amount of acid (for example, sulfuric acid) generated due to the deterioration of the electrolyte membrane 12c and the reaction gas are supplied through the inlet manifold 81. When the acid supplied through the inlet manifold 81 contacts Ce in the portion 84 that serves as the ion adding means/portion, the acid functions as the ion elution promotion means/portion, and $Ce^{3+}$ ions are eluted from the ion adding means/portion 84 by the acid. Then, the $Ce^{3+}$ ions eluted from the ion adding means/portion 84 are supplied into the MEA 125 through the reaction gas passages 120a (120e), and the GDL 12a (12e) (refer to FIG. 9B). Thus, hydrogen peroxide in the MEA 125 is scavenged by the $Ce^{3+}$ ions. In contrast, in the case where the reaction gas is supplied from the non-circulating inflow line through the inlet manifold 81, for example, the eluting solvent and the reaction gas are supplied through the inlet manifold 81. When the eluting solvent supplied through the inlet manifold 81 contacts Ce in the portion 84 that serves as the ion adding means/portion, the eluting solvent functions as the ion elution promotion means/portion, and $Ce^{3+}$ ions are eluted from the ion adding means/portion 84 by the eluting solvent. The $Ce^{3+}$ ions eluted from the ion adding means/portion 84 are supplied into the MEA 125 through the reaction gas passages 120a (120e) and the GDL 12a (12e) (refer to FIG. 9B). Thus, hydrogen peroxide in the MEA 125 is scavenged by the $Ce^{3+}$ ions. That is, by providing the separator 120A in this embodiment, the durability of the fuel cell can be improved in the fuel cell system, irrespective of whether the inflow line is the circulating system or the non-circulating system.

In the above description, the Ce coating is provided on the surface of the portion 84 between the inlet manifold 81 and the reaction gas passages 120a (120e) in the separator. However, in the case where the reaction gas is supplied from the circulating inflow line through the inlet manifold 81, the portion on which the Ce coating is provided is not limited to the portion 84. In the case where the inflow line is the circulating system, the acid (for example, sulfuric acid) that is eluted from the electrolyte membrane and is discharged to the inflow line through the outlet manifold 83 is supplied to the separator again through the inlet manifold 81. Therefore, if the Ce coating is provided on the surface of a portion 85 between the reaction gas passages 120a (120e) and the outlet manifold 83, $Ce^{3+}$ ions can be supplied into the MEA 125. Accordingly, in the case where the reaction gas is supplied from the circulating inflow line through the inlet manifold 81, by providing the Ce coating on the surface of the portion 84 and/or the surface of the portion 85, the portion 84 and/or the portion 85 can serve as the ion adding means/portion 84 and/or the ion adding means/portion 85 in the separator 120A. In contrast, in the case where the reaction gas is supplied from the non-circulating inflow line through the inlet manifold 81, even if the Ce coating is provided on the surface of the portion 85, it is difficult to supply $Ce^{3+}$ ions into the MEA 125. Accordingly, in this case, it is preferable to provide the Ce coating on both of the surface of the portion 84 and the surface of the portion 85, or only on the surface of the portion 84.

Figure 9C:
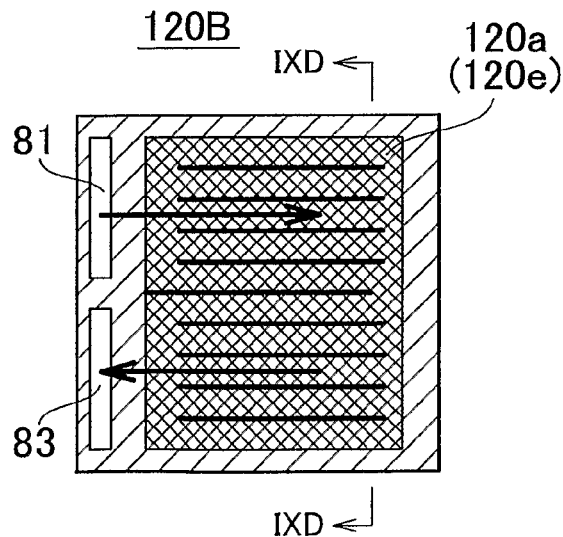
Figure 9D:
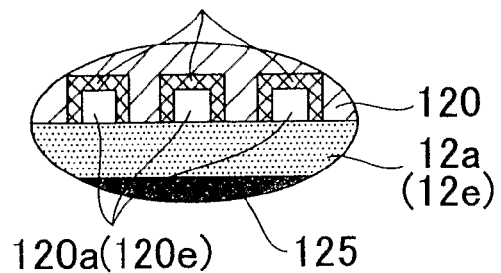

FIG. 9C is a schematic front view of the separator in the FC stack 12, which includes the ion adding means/portion. The ion adding means/portion is provided on the surface of a portion of the separator. FIG. 9D is a sectional view of the separator taken along line IXD-IXD in FIG. 9C. FIG. 9D schematically shows an enlarged portion of the GDL that contacts the separator, and an enlarged portion of the MEA. A separator 120B shown in FIG. 9C includes the inlet manifold 81, the reaction gas passages 120a (120e), and the outlet manifold 83. The Ce coating that serves as the ion adding means/portion is provided on the surface of each groove portion and the surface of each side wall portion (refer to FIG. 9D) of each reaction gas passage 120a (120e). Each arrow in FIG. 9C schematically shows the direction of the flow of the reaction gas. In the case where the separator 120B is provided in the fuel cell system according to the invention, $Ce^{3+}$ ions can be eluted from the ion adding means/portion (the Ce coating) provided on the surface of each reaction passage 120a (120e) in the separator 120B, using the acid and/or the eluting solvent supplied through the inlet manifold 81. Thus, the durability of the fuel cell can be improved in the fuel cell system.

In the above description, the Ce coating that serves as the ion adding means/portion is provided only on the surface of each groove portion and the surfaces of each side wall portion of each reaction gas passage 120a (120e) in the separator 120B. However, in the case where a coating material applied to the surface of each reaction gas passage in the separator in this embodiment is a conductive material such as Ce, the coating that serves as the ion adding means/portion may be provided on the entire surface of each reaction gas passage 120a (120e) including the surface of each protruding portion that contacts the GDL 12a (12e). Each of FIGS. 9E and 9F shows the separator having this configuration.

Figure 9E:
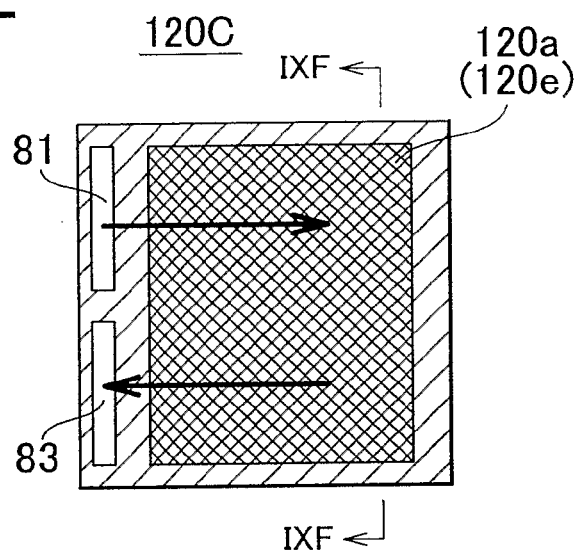
Figure 9F:
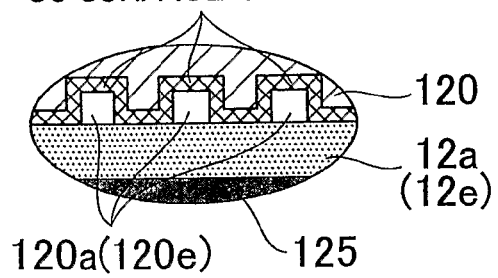

FIG. 9E is a schematic front view of the separator in the FC stack 12. The ion adding means/portion is provided in the entire surface of each reaction gas passage. FIG. 9F is a sectional view of the separator taken along line IXF-IXF in FIG. 9E. FIG. 9F schematically shows an enlarged portion of the GDL that contacts the separator, and an enlarged portion of the MEA. A separator 120C shown in FIG. 9E has the same configuration as that of the separator 120B, except that the Ce coating that serves as the ion adding means/portion is provided on the entire surface of each reaction gas passage 120a (120e) (refer to FIG. 9F). Therefore, in the separator 120C in FIG. 9E, the same portions as those of the separator 120B are denoted by the same reference numerals as in FIG. 9C and FIG. 9D, and detailed description thereof will be omitted. Each arrow in FIG. 9E schematically shows the direction of the flow of the reaction gas. Also, in FIG. 9E, portions corresponding to the protruding portions of the reaction gas passages (i.e., the portions indicated by straight lines in the reaction gas passages 120a (120e) in FIGS. 9A and 9C) are not shown, because the Ce coating is provided on the entire surface of each reaction gas passage 120a (120e) in the separator 120C. In the case where the fuel cell system according to the invention includes the separator 120C, hydrogen peroxide in the MEA 125 can be scavenged by $Ce^{3+}$ ions eluted from the ion adding means/portion (i.e., the Ce coating) that is provided on the entire surface of each reaction gas passage 120a (120e). Therefore, the durability of the fuel cell can be improved in the fuel cell system. Thus, in each of the separators 120B and 120C, the portion of the reaction gas passage on which the coating is provided is appropriately selected from among the groove portion, the side wall portion, and the protruding portion, according to whether the coating material is conductive or non-conductive.

Also, in the above description, the reaction gas passages 120a (120e) is formed in the separator. However, the invention is not limited to a fuel cell system with separators having this configuration. For example, the fuel cell system according to the invention may include flat separators and GDLs, and the reaction gas passages may be formed on the surface of each GDL that contacts the flat separator. In a fuel cell system with this alternative configuration, the Ce coating that serves as the ion adding means/portion may be provided in a portion near the inlet manifold in the separator, in a portion near the outlet manifold in the separator, or in a portion or the whole of the separator surface that contacts the reaction gas passages formed in the GDL.

Further, in the above description, the ion adding means/portion is provided in the inflow line, in the separator, or the like in the fuel cell system. However, the ion adding means/portion may be provided at any number of locations in the fuel cell system in such a manner that $Ce^{3+}$ ions can be supplied into the MEA. For example, the ion adding means/portion may be provided in the inflow line and the separator in the fuel cell system.

As described above, in the fuel cell system according to the invention, the deterioration of the electrolyte membrane is suppressed by supplying $Ce^{3+}$ ions into the MEA from the outside of the MEA. Thus, the durability of the fuel cell can be improved in the fuel cell system. However, in the invention, the ions supplied into the MEA is not limited to $Ce^{3+}$ ions. Other ions that have the ability to scavenge hydrogen peroxide, for example, the ability to decompose hydrogen peroxide, may be used. Examples of other hydrogen peroxide scavenging ions include transition metal ions and rare-earth metal ions. Examples of the substance from which such ions are produced include elements such as Mn, Fe, Pt, Pd, Ni, Cr, Cu, Ce, Se, Rb, Co, Ir, Ag, Au, Rh, Sn, Ti, Zr, Al, Hf, Ta, Nb, Os, Si, and C, and compounds containing at least one of these elements. Although the ion adding means/portion have been described in the specification as including a pipe or portion having the Ce coating from which $Ce^{3+}$ ions are eluted, this should not be construed as limiting the invention to Ce. A coating containing at least one element or one compound among the aforementioned elements and compounds may be provided on the inner surface of the pipe and/or the surface(s) of the portion(s) in the fuel cell system according to the invention. Also, as described above, the ion adding means/portion may include the liquid containing $Ce^{3+}$ ions. In the fuel cell system according to the invention, the ion-containing liquid may contain ions produced from at least one element or one compound among the aforementioned elements and compounds.

In the above description, the manner in which hydrogen peroxide scavenging ions are supplied into the MEA is not limited to a specific manner. For example, the ions may be supplied into the MEA through means/portion for supplying the ions. Also, liquid fuel containing the ions may be supplied to the MEA.

In the above description, the term "substance to be supplied to the MEA" includes, but is not necessarilty limited to, the hydrogen-containing substance to be supplied to the anode (for example, hydrogen gas), the oxygen-containing substance to be supplied to the cathode (for example, air), and vapor and the like that are used to humidify these substances. Also, in the case where the fuel cell system according to the invention is the circulating system in which the hydrogen-containing substance and/or the oxygen-containing substance are circulated, the term "inflow line" includes the entire line constituting the circulating system.

In the above description, each ion supply means/portion includes the pipe or the portion having the Ce coating, and $Ce^{3+}$ ions are eluted from the Ce coating using the acid eluted from the electrolyte membrane 12c and/or the eluting solvent supplied into the inflow line. However, it is considered that $Ce^{3+}$ ions can be eluted, for example, by supplying pure water to the pipe and/or the portion(s). However, it is difficult to effectively suppress the deterioration of the electrolyte membrane using only $Ce^{3+}$ ions eluted by supplying the pure water. Therefore, in the case where the fuel cell system according to the invention includes the pipe and/or the portion(s) from which $Ce^{3+}$ ions, which have the ability to scavenge hydrogen peroxide, are eluted, it is preferable to elute the $Ce^{3+}$ ions from the pipe and/or the portion(s) using the acid eluted from the electrolyte membrane 12c and/or the eluting solvent, in order to effectively suppress the deterioration of the electrolyte membrane 12c.

In the above description, the configuration of the ion elution promotion means/portion is not limited to a specific configuration as long as the ion elution promotion means/portion has the function of promoting elution of the hydrogen peroxide scavenging ions. For example, the ion elution promotion means/portion may promote elution of the ions by humidifying at least one element or one compound among the aforementioned elements and the compounds from which the hydrogen peroxide scavenging ions are eluted. In addition, in the case where the fuel cell system according to the invention includes the circulating inflow line, the ion elution promotion means/portion may promote the elution of the ions using the acid (for example, sulfuric acid) eluted from the MEA (for example, the electrolyte membrane of the MEA in the case of PEFC).

Also, in the above description, any eluting solvent that can elute the hydrogen peroxide scavenging ions may be used. For example, liquid eluting solvent may be used.

In the above description, the ion adding means/portion is provided in the inflow line and/or the separator in the fuel cell system including the PEFC. However, the invention is not limited to the PEFC. For example, the invention may be applied to a direct methanol fuel cell (DMFC). In the case where the DMFC is applied, methanol supplied to the anode may contain the hydrogen peroxide scavenging ions (for example, $Ce^{3+}$ ions) so that the ions can be supplied to the MEA. With this configuration, the durability of the fuel cell can be improved in the fuel cell system.

Figure 10:
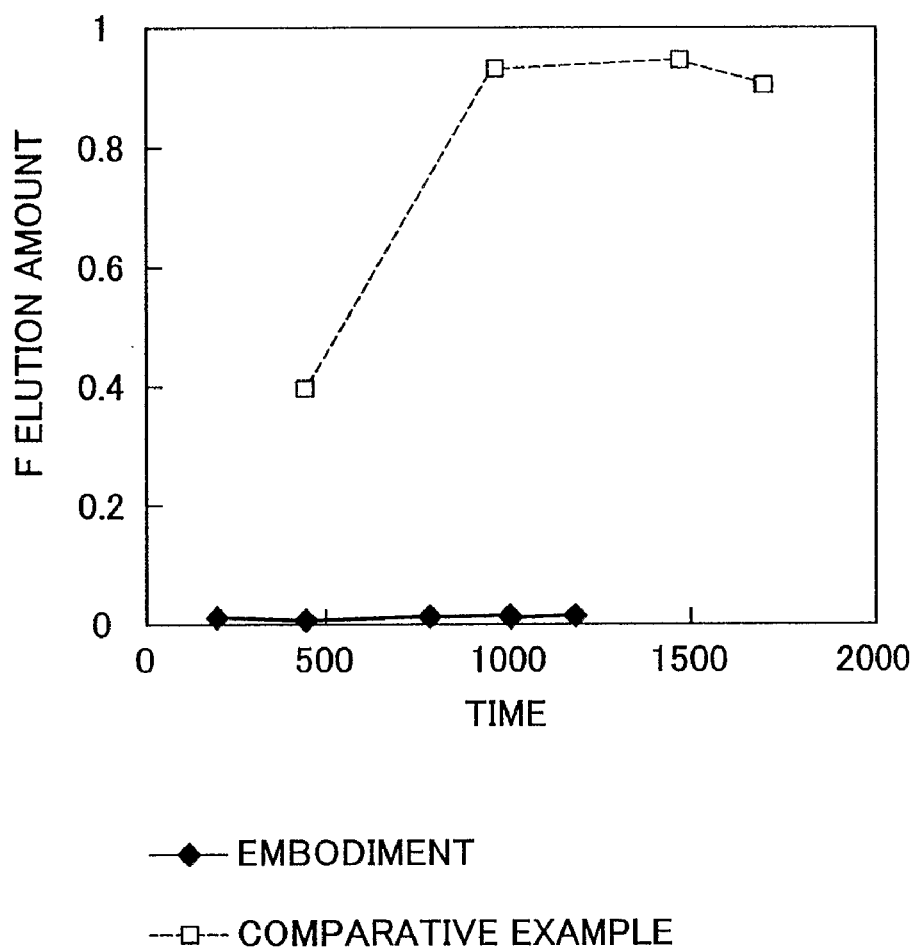
FIG. 10 is a graph showing the result of a durability test.

The durability test was conducted using two MEAs. The hydrogen peroxide scavenging ions were supplied into one of the MEAs from the outside of the MEA by supplying liquid containing Ce ions ($Ce^{3+}$ ions). The other MEA did not contain Ce ions. That is, the durability test was conducted using the MEA in the embodiment of the invention, and the MEA in a comparative example. The amount of F ions contained in water collected from each of the MEAs (i.e., the F elution amount) was measured. FIG. 10 shows the result about the MEA in the embodiment of the invention and the result about the MEA in the comparative example. The horizontal axis of FIG. 10 indicates time. The vertical axis of FIG. 10 indicates the F elution amount. A solid line of FIG. 10 indicates the result about the MEA in the embodiment of the invention. A dashed line of FIG. 10 indicates the result about the MEA in the comparative example. Each of the MEA in the embodiment of the invention and the MEA in the comparative example included the electrolyte membrane containing fluorine resin. Because F ions are eluted when the electrolyte membrane containing fluorine resin deteriorates, the F elution amount can be used as an indicator of durability.

As shown in FIG. 10, a great amount of F ions were eluted from the MEA in the comparative example over time. However, the amount of F ions eluted from the MEA in the embodiment of the invention was greatly reduced. Thus, the result of the test shows that the durability of the fuel cell can be improved in the fuel cell system according to the invention.

The invention claimed is:

1. A fuel cell system comprising:
a stack body, formed by stacking a membrane-electrode assembly and a separator, the membrane-electrode assembly including an electrolyte layer and electrode layers, one of which is provided on one side of the electrolyte layer and the other of which is provided on the other side of the electrolyte layer; and
supply means configured to supply ions which scavenge hydrogen peroxide to the membrane-electrode assembly, wherein
the supply means includes at least one of a first inflow line for supplying a substance containing hydrogen to a first electrode layer of the electrode layers, and a second inflow line for supplying a substance containing oxygen to a second electrode layer of the electrode layers; and
the supply means includes ion adding means which is provided in the at least one of the first inflow line and the second inflow line, and which adds the ions to the substance flowing in the at least one of the first inflow line and the second inflow line.

2. The fuel cell system according to claim 1, wherein the ions have an ability to decompose hydrogen peroxide.

3. A fuel cell system comprising:
a stack body, formed by stacking a membrane-electrode assembly and a separator, the membrane-electrode assembly including an electrode layer and electrode layers, one of which is provided on one side of the electrode layer and the other of which is provided on the other side of the electrode layer; and supply means configured to supply ions which scavenge hydrogen peroxide to the membrane-electrode assembly, wherein the supply means includes an inflow line for supplying a substance that carries the ions to the membrane-electrode assembly, and ion adding means for adding the ions to the substance to be supplied to the membrane-electrode assembly; wherein the ion adding means is provided in at least one of the inflow line and the separator.

4. The fuel cell system according to claim 3, wherein the ion adding means includes ion-containing liquid storage means for storing liquid containing the ions; and introduction means for introducing the liquid in the ion-containing liquid storage means to the at least one of the inflow line and the separator.

5. The fuel cell system according to claim 4, wherein the introduction means includes control means for controlling a mode in which the liquid containing the ions is introduced to the at least one of the inflow line and the separator.

6. The fuel cell system according to claim 3, wherein the ion adding means includes at least one of an element and a compound from which the ions are eluted; and ion elution promotion means for promoting elution of the ions from the at least one of the element and the compound.

7. The fuel cell system according to claim 6, wherein the ion elution promotion means is an eluting solvent adding means for adding eluting solvent that elutes the ions.

8. The fuel cell system according to claim 7, wherein the ion adding means includes the compound and the eluting solvent adding means; the compound is a metal oxide; and the eluting solvent added by the eluting solvent adding means is acidic.

9. The fuel cell system according to claim 6, wherein the at least one of the element and the compound is replaceable.

10. The fuel cell system according to claim 9, wherein the ion adding means includes the compound and an eluting solvent adding means; the compound is a metal oxide; and eluting solvent added by the eluting solvent adding means is acidic.

11. The fuel cell system according to claim 6, wherein the at least one of the element and the compound is provided in a portion of a pipe extending in a horizontal direction and constituting the inflow line, which includes at least a low portion of the pipe in a direction of gravitational force; and an amount of the at least one of the element and the compound per unit area of the portion of the pipe is greater than an amount of the at least one of the element and the compound per unit area of any other portion of the pipe.

12. The fuel cell system according to claim 11, wherein the ion adding means includes the compound and an eluting solvent adding means; the compound is a metal oxide; and eluting solvent added by the eluting solvent adding means is acidic.

13. The fuel cell system according to claim 6, wherein a hygroscopic material is provided in at least a portion of a surface of the at least one of the element and the compound.

14. The fuel cell system according to claim 13, wherein the ion adding means includes the compound and an eluting solvent adding means; the compound is a metal oxide; and eluting solvent added by the eluting solvent adding means is acidic.

15. A fuel cell system comprising:
a stack body, formed by stacking a membrane-electrode assembly and a separator, the membrane-electrode assembly including an electrolyte layer and electrode layers, one of which is provided on one side of the electrolyte layer and the other of which is provided on the other side of the electrolyte layer; and
a supply portion configured to supply ions which scavenge hydrogen peroxide to the membrane-electrode assembly, wherein
the supply portion includes at least one of a first inflow line for supplying a substance containing hydrogen to a first electrode layer of the electrode layers, and a second inflow line for supplying a substance containing oxygen to a second electrode layer of the electrode layers; and
the supply portion includes ion adding portion which is provided in the at least one of the first inflow line and the second inflow line, and which adds the ions to the substance flowing in the at least one of the first inflow line and the second inflow line.

16. The fuel cell system according to claim 15, wherein the ions have an ability to decompose hydrogen peroxide.

17. A fuel cell system comprising:
a stack body, formed by stacking a membrane-electrode assembly and a separator, the membrane-electrode assembly including an electrolyte layer and electrode layers, one of which is provided on one side of the electrolyte layer and the other of which is provided on the other side of the electrolyte layer; and
a supply portion configured to supply ions which scavenge hydrogen peroxide to the membrane-electrode assembly, the supply portion being external to the membrane-electrode assembly, wherein
the supply portion includes an inflow line for supplying a substance that carries the ions to the membrane-electrode assembly, and ion adding portion that adds the ions to the substance to be supplied to the membrane-electrode assembly; wherein the ion adding portion is provided in at least one of the inflow line and the separator.

18. The fuel cell system according to claim 17, wherein the ion adding portion includes at least one of an element and a compound from which the ions are eluted; and ion elution promotion portion that promotes elution of the ions from the at least one of the element and the compound.

19. The fuel cell system according to claim 18, wherein the ion elution promotion portion is eluting solvent adding portion for adding eluting solvent that elutes the ions.

20. The fuel cell system according to claim 19, wherein the ion adding portion includes the compound and the eluting solvent adding portion; the compound is a metal oxide; and the eluting solvent added by the eluting solvent adding portion is acidic.

21. The fuel cell system according to claim 18, wherein the at least one of the element and the compound is replaceable.

22. The fuel cell system according to claim 18, wherein the at least one of the element and the compound is provided in a portion of a pipe extending in a horizontal direction and constituting the inflow line, which includes at least a low portion of the pipe in a direction of gravitational force; and an amount of the at least one of the element and the compound per unit area of the portion of the pipe is greater than an amount of the at least one of the element and the compound per unit area of any other portion of the pipe.

23. The fuel cell system according to claim 18, wherein a hygroscopic material is provided in at least a portion of a surface of the at least one of the element and the compound.

24. The fuel cell system according to claim 17, wherein the ion adding portion includes ion-containing liquid storage portion that stores liquid containing the ions; and introduction portion that introduces the liquid in the ion-containing liquid storage portion to the at least one of the inflow line and the separator.

25. The fuel cell system according to claim 24, wherein the introduction portion includes control portion that controls a mode in which the liquid containing the ions is introduced to the at least one of the inflow line and the separator.

* * * * *